Patented June 2, 1942

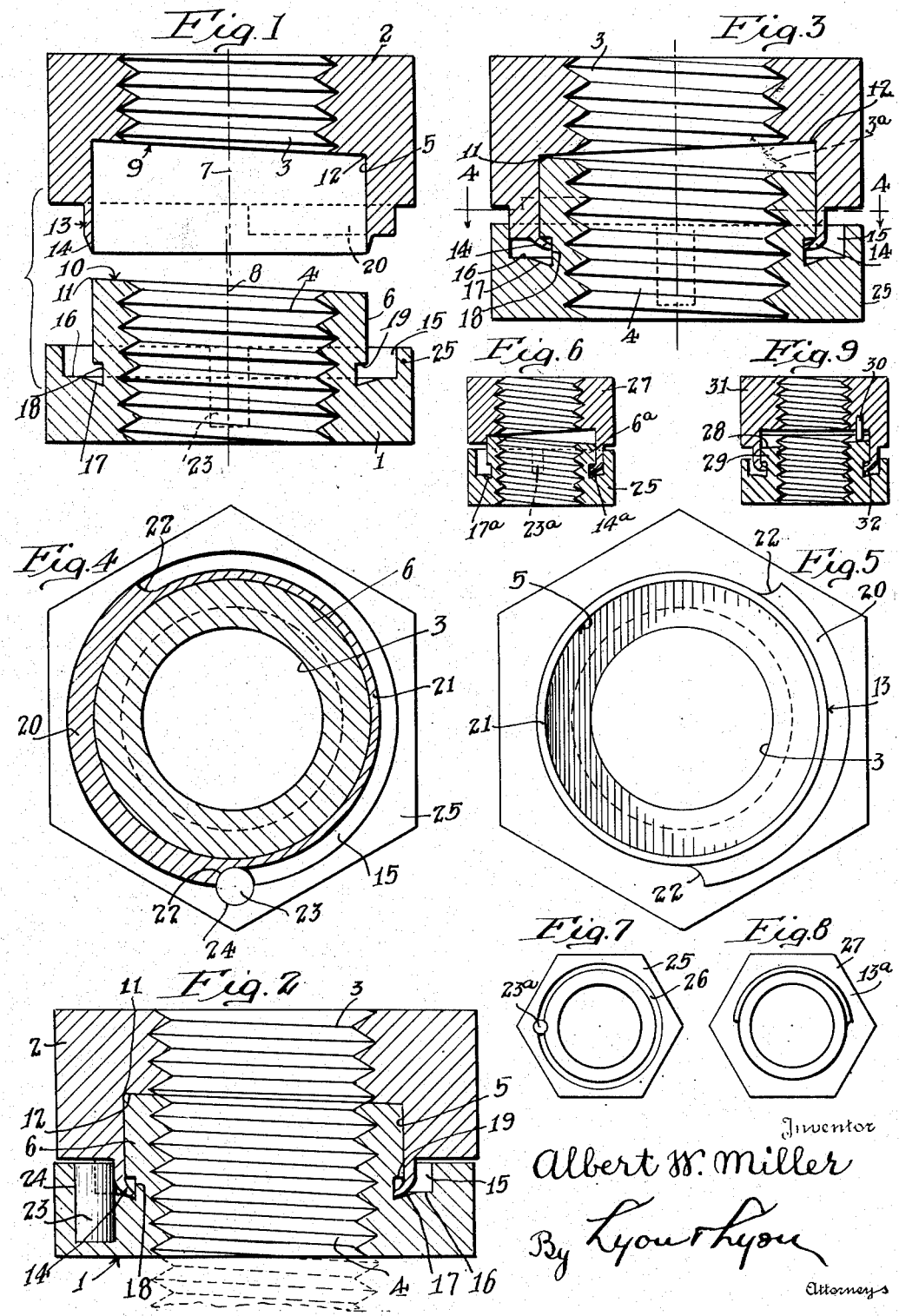

2,285,345

UNITED STATES PATENT OFFICE 2,285,345

LOCK-NUT CONSTRUCTION

Albert W. Miller, Jamaica, N. Y.

Application June 10, 1940, Serial No. 339,702

7 Claims. (Cl. 151—19)

This invention relates to a lock-nut construction. As is well known, when a nut on a threaded member such as a bolt, is subjected to vibration, it will work loose.

In some aspects, this invention may be considered an improvement of my prior invention disclosed in my U. S. Patent No. 2,244,400 of June 3, 1941 an application filed February 24, 1940.

An object of this invention is to provide a simple lock-nut construction which will operate when in use, to offer a very considerable resistance to unscrewing.

The lock-nut construction of this invention involves the use of two lock members having threaded openings to receive a threaded member such as a bolt, and these two members are telescoped together through the agency of an eccentric connection. When the eccentric connection is at a point of substantially no eccentricity, the axes of the threaded openings in the two nut members, are in alignment, which enables the complete nut composed of the two lock members, to be applied to a threaded member such as a bolt. After the inner lock member has become seated against the part that it is to retain, then the outer or upper nut member is given a rotation through a critical angle, that is to say, an angle sufficient to effect the maximum relative lateral displacement of the nut-members due to the eccentric connection, at which point, means provided in the construction of the nut, operates to arrest further relative rotation of the nut sections. With the nut members left in this position, it is evident that opposed clamping forces are developed, causing one nut section to press strongly against one side of the bolt member while the other nut section is pressed tightly against the other side of the bolt. The upper or outer nut member will not become loose, because in order to do so it would have to tighten the eccentric connection. For practical reasons it is necessary to provide a construction for these two nut members, which will enable them to be handled as a unit, and in doing this it is also necessary to hold the nut members in a position which will enable their threads to be of the same phase, that is to say, in a position to enable the two nut members to be applied simultaneously to a threaded bolt.

One of the objects of this invention is to provide simple means for accomplishing these purposes, and operating to hold the two nut members in their proper position for applying them to the bolt.

A further object of the invention is to provide a correlated connection between the nut members, which will enable the unscrewing of the outer or upper nut member to automatically "pick up" the inner nut member and unscrew it at the same time, after the outer nut member has made a partial turn.

Further objects of the invention will appear hereinafter.

The invention consists in the novel parts and combination of parts to be described hereinafter, all of which contribute to produce an efficient lock-nut construction.

A preferred embodiment of the invention is described in the following specification, while the broad scope of the invention is pointed out in the appended claims.

In the drawing:

Fig. 1 is a vertical section taken through two nut members in the position to be telescoped together to form a complete nut.

Fig. 2 is a view similar to Fig. 1, and showing the same parts but indicating them in their completely telescoped relation in which they are placed in one step of forming the complete nut. This section may be considered as a section taken in a plane at right angles to the plane of section in Fig. 3, with the understanding that the parts in Fig. 2 are shown more fully telescoped than they are in Fig. 3.

Fig. 3 is a vertical section through the complete nut, taken in a plane at right angles to Fig. 2 and showing the nut members held in a less telescoped condition than in Fig. 2. In the relation shown in Fig. 3, the nut is complete and ready to be applied to the bolt.

Fig. 4 is a section through the complete nut, taken on the line 4—4 of Fig. 3.

Fig. 5 is a bottom plan of the upper nut member.

Fig. 6 is a view similar to Fig. 3, that is to say, it is taken through the nut members in their telescoped condition ready to be applied to a bolt, but illustrates a slight modification in the construction shown in Figs. 1 to 5.

Fig. 7 is a plan of the lower nut member shown in Fig. 6, but showing the same rotated through 90° from the position in which it is shown in Fig. 6.

Fig. 8 is a bottom plan view of the upper nut member illustrated in Fig. 6, but before it has been applied to the lower nut member.

Fig. 9 is a view similar to Fig. 6, but illustrating a slight modification as regards one of the features of construction.

Referring to Figs. 1 to 4, the lock-nut construction includes an inner nut member 1 and an outer nut member 2, that have threaded openings 3 and 4 of the same diameter and pitch. These two nut members are constructed so that they can telescope together through the agency of an eccentric connection; and in operation, by reason of this eccentric connection, when the outer nut member 2 is rotated relatively to the inner nut member 1, the nut members will be jammed on the eccentric connection so that one of the nut members will be forced in one direction against one side of the bolt on which the nut is placed, and the other nut member will be forced through the agency of the eccentric connection, against the other side of the bolt. In order to accomplish this, I prefer to provide the upper nut member 2 with an eccentric circular socket 5, and on the lower nut member 1 provide an eccentric circular neck 6 which is adapted to fit snugly into the socket. In the neutral position of the nut members, that is to say, when the axes of eccentricity of the two nut members are in a position substantially removed from their position of maximum lateral displacement, then the axes 7 and 8 of the threaded openings will be in line. In this position the two nut members in their telescoped condition are to be screwed onto the threaded member or bolt member to which the nut is to be attached. But in order to do this, it is necessary to hold the nut members 1 and 2 a certain distance apart, corresponding to the pitch of the thread, so that the threads in the opening 3 and in the opening 4, will be in the same phase; and so that the nut-members can be rotated through a sufficient angle to effect the maximum lateral displacement of the nut-members with respect to each other. For this reason I provide means for yieldingly limiting the telescoping movement of the nut members toward each other, but permitting the nut members to telescope more completely when the outer nut member is rotated relatively to the inner nut member through a sufficient angle. I also provide means for arresting this relative rotation immediately, or shortly after it has passed through the critical angle, which in the present instance is 180°. By doing this the nut members are jammed on each other, in a laterally shifted relation that causes them to grip the bolt, but the outer nut member 2 will not work loose from vibration because in order to do so it would have to become tighter on the eccentric neck 6 in rotating in its unlocking direction. While different means may be employed for accomplishing these two functions, in the present instance, it can be accomplished by a single means as will now be described. This means includes an inclined face on one of the nut members, and means on the other nut member to engage the inclined face to limit the telescoping movement. The two nut members are so corelated that although a contact with this inclined face in one relative position of the nut members, will limit their telescoping movement, nevertheless this contact will not prevent the relative rotation through the critical angle, that will cause the nut members to lock themselves on the bolt, and in the present instance the function of limiting the relative rotation can be accomplished through the medium of this same inclined face. In the present instance, and in the embodiment of the invention illustrated in Figs. 1 to 4, I prefer to employ two inclined faces, namely, an inclined face 9 that forms the bottom face of the socket 5, and the inclined face 10 that forms the upper end face of the neck 6. These two faces are preferably cut on the same incline or pitch as the thread (see Fig. 1). When the nut members are telescoped together in the relation indicated in Fig. 3, the high point 11 of the neck 6 will be in engagement with the low point 12 of the inclined face 9, and this will limit the telescoping movement. In this relative position of the nut members, the axes 7 and 8 of the two nut members coincide with each other, and the nut is in the position to enable it to be screwed onto the bolt. If desired, in practice the neck 6 can be made so that it is friction-tight in the socket 5, in which case it will be unnecessary to provide any means for maintaining the nut members in their telescoped relation. However, if it is desired to provide positive means for accomplishing this, I prefer to provide a downwardly extending fin 13 adjacent the inner face of the socket 5, and this fin has a tapered tip 14 of relatively thin material. The inner nut member 1 is formed with a circular groove 15 at its shoulder 16, and the bottom of this groove presents a slightly conical or inclined face 17 disposed below an undercut groove 18 on the side of the neck that forms an annular shoulder 19 around the neck. The nut members should be formed of any suitable material that would enable the tip 14 of the fin to bend. In assembling the nut members, they are telescoped together under pressure in the oriented relation indicated in Fig. 2. Forcing the nut members together causes the tip 14 of the fin 13 to strike against the conical face 17, which bends this tip inwardly against the reduced diameter of the neck 6 below the shoulder 19. This shoulder 19 is preferably of uniform width. After this is accomplished, the nut members are rotated relatively through the critical angle, or 180°, which will bring them into the relation indicated in Figure 3. In other words, the inclined faces 9 and 10 will cooperate by riding on each other to raise the outer nut member 2 on the inner nut member. This movement should be sufficient to bring the root of the crimped tip 14 into substantial contact with the annular shoulder 19. This shoulder will then cooperate with the crimped fin 14 to maintain the nut members in their telescoped relation. When the nut members are in the relation indicated in Figure 3, the axes of the two threaded openings of the nut members will be in alignment. With the parts in this position, they can be screwed onto the bolt, the thread of which will cooperate continuously with the threads in the two members, as indicated by the dotted lines 3a in Fig. 3. After the bottom face of the lower nut member 1 comes against the face of the part that is to be retained by the nut, it will be tightened up by the socket wrench that is fitting completely over the two nut members as though they constituted a single nut. After the lower nut member 1 has been seated, the wrench is pulled back axially on the nuts slightly so as to engage only the upper nut member 2, and this nut member is then rotated through a critical angle, that is, an angle sufficient to effect the maximum relative lateral displacement, which in the present instance is, after a rotation through 180°, at which point the faces 9 and 10 will have full contact with each other as indicated in Fig. 2, and arrest further relative rotation of the nut member 2. In this position the nut member 2 will have rotated past the high point of the eccentric neck 6, and hence great resistance will be offered to a backward relative rotation of the nut member 2, and as this nut member would have to tighten itself by this backward rotation, it will remain unaffected by a vibration in the position in which it is left.

In removing a lock-nut embodying my invention, the upper nut 2 should be rotated first to back it off. I provide means coming into action after a backward rotation through the critical angle, or 180° has taken place, to enable the outer nut 2 to "pick up" the lower nut 1 and back it off of the thread of the bolt. In order to accomplish this, I prefer to provide the fin 13 with a sector 20 of increased thickness (see Fig. 4). This leaves a relatively thin sector 21 of more than 180°, and provides a shoulder 22 at one end of the thick segment 20 which, in the backward rotation of the upper nut member 2, will strike against a stop or stop pin 23 that is secured in the lower nut member 1 and projects at one side into the groove 15. The top of this pin 23 may be in line with the face of the shoulder 16 as indicated in dotted lines in Fig. 1. It will be evident that the pressure exerted by the shoulder 22 upon the pin 23, tends to hold the pin 23 back in its half round socket 24 that is formed for it in the upwardly projecting skirt 25 of the lower nut member.

It is advantageous to have the flat sides of the nuts in alignment when applying the nut-members to the bolt to facilitate the use of a wrench operating on both of the nuts in securing the nut-members onto the bolt. It is also advantageous to have the outside nut-member come to rest in an oriented position in which its flats will be considerably out of line with the flats of the inner nut-member. It is obvious that in constructing the nut-members, these conditions can be obtained and varied by definitely locating and shifting through any desired angle the axis of eccentricity, with respect to an axis drawn through diametrically opposite corners of the nut-members. And it is also obvious that the coinciding axes of the threaded bores are not necessarily located on the axis of eccentricity when the nut-members are screwed onto the bolt. In other words, the nut-members could be bored or drilled for threading so that they will align, and can be screwed onto the bolt member in a position in which the nut-members would require a rotation of less than 180° to effect the maximum relative lateral displacement of the nut-members and, of course, the high point of the inclined faces would be shifted correspondingly, that is to say, oriented with respect to the axis of eccentricity to stop the rotation soon after the condition of maximum lateral displacement has occurred. And, if desired, the rotation can be stopped by impingement of the faces that lie adjacent the section line 4—4 of Fig. 3.

The construction described in connection with Figs. 1 to 4, is particularly useful on nuts of relatively large size. If a nut is to be made of a small size, I may employ the construction illustrated in Figs. 6, 7 and 8, in which the pin 23a of the lower nut member 25 extends all the way across the groove 26 in the lower nut member. The bottom face of the upper nut member 27 is provided with a fin 13a that corresponds to the fin 13, but which is cut away for more than 180°. When these two nut members are put together as illustrated in Fig. 6, the fin 13 fills the entire width of the groove 26, and although it only engages the side of the neck 6a (corresponding to the neck 6) throughout about 180°, it will operate to keep the nut members in line and in engagement with each other. These two nut members 25 and 27 are assembled in the same way as that described in connection with the nut illustrated in Figs. 1 to 4, the lower end of the fin 13a having a reduced tip 14a that is bent by contact with a substantially conical face 17a, as illustrated in Fig. 6.

In Fig. 9 I illustrate a construction in which I employ an inclined face on only one of the nut members instead of two inclined faces such as the faces 9 and 10 illustrated in Fig. 1. In this instance, I provide an inclined face 28 which is cut away for more than 180° of the circumference of the neck 29 at the upper end of the neck; and I provide a pin 30 in the under side of the upper nut member 31, which pin engages the high side of the inclined face 28 when the axes of the two nut members are in alignment with each other. The nut members would be forced together with the pin 30 over at the left side of the neck 29, as viewed in Fig. 9. This telescoping movement will crimp the fin 32 in the manner described above, whereupon the upper nut member would be rotated back with the pin 30 riding up on the inclined face 28 to raise the nut member 31 relatively to the lower nut member.

Many other embodiments of the invention may be resorted to without departing from the spirit of the invention.

The amount of eccentricity for the socket 5 is small. This would be determined by the requirements for different nut diameters and the various thread tolerances desired.

What I claim is:

1. In a lock nut construction to be applied on an externally threaded member, the combination of a pair of telescoping nut-members with threaded openings to screw on to the externally threaded member, an eccentric connection between said nut-members capable of assuming a neutral position in which the axes of the threaded openings are in alignment with each other, said nut-members having parts engaging each other in the said neutral position of the nut-members for yieldingly limiting the telescoping movement of said nut-members toward each other, but constructed so as to permit the nut-members to telescope more completely when the same are relatively rotated, and correlated stop means on the nut-members for arresting the relative rotation of said nut-members shortly after one of the nut-members has been rotated relatively to the other through the critical angle that effects the maximum relative lateral displacement of the nut-members, said stop means cooperating to enable the backward rotation of the outer nut-member in unscrewing the same, to back off the inner nut-member.

2. In a lock nut construction to be applied on an externally threaded member, the combination of two telescoping nut-members with threaded openings therethrough, an eccentric connection between the nut-members, said nut-members having means for yieldingly holding them in a neutral position to permit the threaded openings to be applied on the externally threaded member, said eccentric connection operating upon a relative rotation of said nut-members, to effect a relative lateral displacement of said nut-members to clamp the same at the threaded openings, one of said nut-members having a stop and the other having a shoulder cooperating therewith to prevent further relative rotation of the nut-members after the same have been rotated past a critical angle sufficient to effect the maximum relative lateral displacement of said nut-members.

3. In a lock-nut construction to be applied on an externally threaded member, the combination of two telescoping nut-members with threaded openings therethrough, an eccentric connection between the nut-members, said nut-members having means for yieldingly holding them in a neutral position to permit the threaded openings to be applied on the externally threaded member, said eccentric connection operating upon a relative rotation of said nut-members, to effect a relative lateral displacement of said nut-members to clamp the same at the threaded openings, said nut-members having inclined adjacent faces operating upon a relative rotation of the nut-members beyond the angle that is sufficient to effect the maximum relative lateral displacement of the nut-members, to engage each other and prevent further relative rotation of the nut-members.

4. In a lock-nut construction, the combination of a pair of nut-members having threaded openings therethrough, to be screwed onto an externally threaded member, one of said nut-members having an eccentric socket and the other having an eccentric neck fitting into the socket, said socket having an inclined face at its bottom, and said neck having an inclined face at its end, said inclined faces cooperating when the axes of the threaded openings are in alignment to hold the nut-members in a position to enable them to be screwed onto the externally threaded member, operating to permit a relative rotation of the outer nut-members in a forward direction, said inclined faces operating to engage each other upon a relative rotation through one hundred and eighty degrees, to lock the nut-members on the bolt member.

5. In a lock-nut construction, the combination of a pair of nut-members having threaded openings therethrough, to be screwed onto a bolt member, one of said nut-members having an eccentric socket and the other having an eccentric neck fitting into the socket and forming an eccentric connection between the nut-members, said nut-members having a neutral position in which the axes of the two threaded openings are in alignment with each other to enable the same to be screwed onto the bolt, said socket having an inclined bottom face, and said neck having an inclined end face, both of said faces being inclined at substantially the same angle as the thread pitch of said openings, said faces forming an angle with each other with the high point of said neck and the low point of the inclined bottom of the socket in substantial contact with each other when the nut-members are in their neutral position, and operating to limit yieldingly the telescoping movement of the nut-members, means for maintaining the nut-members in their telescoped relation, said inclined faces operating upon a relative forward rotation of the outer nut-member, to come together in a substantially parallel relation and arrest further relative rotation after the outer nut-member has rotated through an angle of one hundred and eighty degrees on the inner nut-member.

6. In a lock-nut construction, the combination of a pair of nut-members having threaded openings therethrough, to be screwed onto a bolt member, one of said nut-members having an eccentric socket and the other having an eccentric neck fitting into the socket and forming an eccentric connection between the nut-members, said nut members having a neutral position in which the axes of the two threaded openings are in alignment with each other to enable the same to be screwed onto the bolt, said socket having an inclined bottom face, and said neck having an inclined end face, both of said faces being inclined at substantially the same angle as the thread pitch of said openings, said faces forming an angle with each other with the high point of said neck and the low point of the inclined bottom of the socket in substantial contact with each other when the nut-members are in their neutral position, and operating to limit yieldingly the telescoping movement of the nut-members, means for maintaining the nut-members in their telescoped relation, said inclined faces operating upon a relative forward rotation of the outer nut member, to come together in a substantially parallel relation and arrest further relative rotation after the outer nut-member has rotated through an angle of one hundred and eighty degrees on the inner nut-member, and correlated stop means on the said nut-members operating to engage when the outer nut-member is rotated backwardly, to effect also the backward rotation of the inner nut member.

7. In a lock-nut construction, the combination of a pair of telescoping nut-members with threaded openings to screw onto a bolt, one of said members having an eccentric socket and the other having an eccentric neck fitting therein to form an eccentric connection, said nut-members having parts engaging each other in the neutral position of the eccentric connection, including an inclined face on one of the members and a part on the other member to ride thereon, for yieldingly limiting the telescoping movement of said nut-members, said engaging parts cooperating so that after a relative rotation of the nut-members through an angle of one hundred and eighty degrees the relative rotation will be arrested.

ALBERT W. MILLER.